Fig. 2.

INVENTORS
JOHN S. STOKES
EDGAR W. BLEAM

May 20, 1952     J. S. STOKES ET AL     2,597,042

TWO-WEB ROTARY BRUSH WRAPPING MACHINE

Filed April 7, 1947     5 Sheets-Sheet 3

INVENTORS
JOHN S. STOKES
EDGAR W. BLEAM
BY

May 20, 1952  J. S. STOKES ET AL  2,597,042
TWO-WEB ROTARY BRUSH WRAPPING MACHINE
Filed April 7, 1947  5 Sheets-Sheet 5

INVENTORS
JOHN S. STOKES
EDGAR W. BLEAM
BY

Patented May 20, 1952

2,597,042

UNITED STATES PATENT OFFICE 2,597,042

TWO-WEB ROTARY BRUSH WRAPPING MACHINE

John S. Stokes, Huntingdon Valley, and Edgar W. Bleam, Philadelphia, Pa., assignors to Stokes & Smith Company, a corporation of Pennsylvania Application April 7, 1947, Serial No. 739,858

16 Claims. (Cl. 18—21)

This invention is directed to a novel apparatus or machine for wrapping objects of various kinds and of various sizes and shapes. While capable of much wider application, the invention is particularly useful for the wrapping of perishable products, such as meats, vegetables, fruits, etc., contemplating as it does the air-tight packaging of these products.

Generally speaking, the machine comprises means for feeding two continuous strips of heat-stretchable and heat-sealable sheet material through the machine in opposed spaced relation to each other, means for heating the strips progressively to impart to them the requisite stretchable and sealable properties, means for stretching the heated strips longitudinally to increase their wrapping area with a consequent reduction in gauge, and for maintaining the strips in their stretched condition until the wrapping operation has been performed, means for feeding the objects to be wrapped between the strips in longitudinal spaced relation as the strips are fed along, means for pressing the advancing strips together to seal them around the successive objects to form a series of individual packages, means for vacuumizing the packages as they are successively formed, and, finally, means for delivering the wrapped objects or packages from the machine.

To be more specific, but without intending to limit the invention:

The wrapping means are in the form of a pair of cooperating rotary brushes (an upper one and a lower one, with their axes of rotation in vertical alignment) whose bristles provide flexible yielding surfaces which force the strips together into face to face contact except in those areas occupied by the objects and which at the same time allow said objects to stretch such localized areas of the strips still further and conform them thereto. The rotary brushes have resilient backings for the bristles and thus may accommodate themselves to objects of very large size. In the specific embodiment illustrated, the rotary brushes are each made up from a single flexible strip in which the bristles are anchored and which is wound helically around a pneumatic supporting drum consisting of a metal rim with side flanges and a rubber dam or band sealed to the flanges in airtight fashion.

The two rotary brushes are located between and mounted to rotate on the same axes with two pairs of gripper wheels (an upper pair for the upper brush and a lower pair for the lower brush) which engage the respective strips at their opposite edges, as they leave the feed rolls, and advance them in unison through the machine, these gripper wheels being operated at a higher rate of speed than that of the feed rolls whereby to stretch the strips longitudinally to a substantial extent before they reach the wrapping station. The gripper wheels, after stretching the two strips, maintain them in their stretched condition until the wrapping operation has been performed by the rotary brushes and then release the strips to permit the wrapped objects to be removed from the machine.

The vacuumizing of the successive packages is accomplished by the use of two suction nozzles arranged at opposite sides of the advancing strips, both nozzles being mounted on stationary supports with their inlet ends positioned between the two strips but terminating just short of the sealing point of the strips. These nozzles are swiveled to their supports for a lateral swinging movement toward and from the center line of the strips and are normally held under spring tension in their innermost (almost touching) position. According to this arrangement, the two nozzles will be contacted and pushed apart by the successive objects as they are fed between the two strips, the inlet ends of the nozzles (because of the spring tension) being caused to follow or drag along the opposite sides of each object as the two strips are sealed about it. The vacuum thus acts progressively during the formation of each individual package, becoming fully effective just prior to the final sealing of the package. When this final sealing occurs, the package, of course, is rendered completely air-tight.

The gripper wheels of each pair are adjustable axially toward and from each other to accommodate strips of different widths, such adjustment being effected by manually operable means normally disconnected from the wheels to permit their free rotation during the operation of the machine. Such manual adjusting means are common to both pairs of gripper wheels and are operable to effect the adjustment of the gripper wheels of both pairs simultaneously.

The machine is equipped with an infeed conveyor belt, as well as with an outfeed conveyor belt, each belt being adjustable to different positions to centralize the objects with reference to the sealing plane of the two strips. The adjustment of the conveyor belts is effected by manually operable mechanism which includes parallel motion links having a radius equal to that of the rotary wrapping members, whereby the delivery end of the infeed belt and the receiving end of the outfeed belt will be caused to travel in their adjustments in arcuate paths conforming to the periphery of the lower wrapping member.

The machine is also equipped with manual adjusting means for breaking contact between the strip heating rolls and the advancing strips when desired, as for instance when the operation of the machine is arrested or when the strips are being threaded through the machine preparatory to operation. In this connection, it may be noted that the feed rolls are mounted for bodily separation to facilitate the threading of the strips between them.

These and various other features will be more fully set forth in the detailed description to follow.

While various types of sheet material may be used in the practice of the invention (such as polyvinyl chloride, chlorinated polyvinyl chloride, polyvinyl acetate, etc.), it is proposed to employ, as the most satisfactory wrapping material, a rubber hydrochloride film such as is disclosed in the Calvert Patent No. 1,989,632, and which is known to the trade as Pliofilm. This material is manufactured in sheets of various thicknesses, ranging from .0008" to .003", but even thinner or thicker sheets would be suitable. As is now well known, Pliofilm when heated momentarily (i. e., for a few seconds only) is not only heat-stretchable and heat-sealable but becomes highly elastic, which means that when stretched in heated condition the film will return to its original unstretched condition unless it is maintained in its stretched condition until it becomes cool and set in that condition. This elastic property of the film is most useful in the practice of this invention, in that it contributes to the production of smooth tight-fitting wrappings for the objects to be packaged. A convenient heat-stretching and heat-sealing temperature is in the neighborhood of 240° F. and this temperature may be obtained by a few seconds contact with a heated roll maintained at a temperature of say 300° F.

Referring to the drawings.

In the preferred embodiment illustrated, the machine has been designed for continuous operation at high speed and hence the different organs of the machine are continuously operated.

The two strips of heat-stretchable and heat-sealable sheet material, designated A and $A^1$, are drawn from their supply rolls B and $B^1$ by sets of feed rolls C and $C^1$ and passed over and around heated rolls D and $D^1$ into engagement with two pairs of gripper wheels E and $E^1$ which carry the strips into the bight of the rotary wrapping members F and $F^1$ for the wrapping operation. The objects to be wrapped, designated G, are fed to the wrapping members by a conveyor belt H and the wrapped objects, designated $G^1$, are delivered from the machine by a conveyor belt $H^1$. All of these organs, with their component parts, are mounted in a suitable framework, designated generally by the letter J.

Since the feed rolls C and $C^1$, the heated rolls D and $D^1$, the pairs of gripper wheels E and $E^1$, and the rotary wrapping members F and $F^1$ are duplicates of one another, a description of one set will serve for both. However, to distinguish between the two sets, plain reference numerals will be applied to the parts of one set and the same reference numerals with the exponent $a$ applied to the corresponding parts of the other set.

Figure 8:
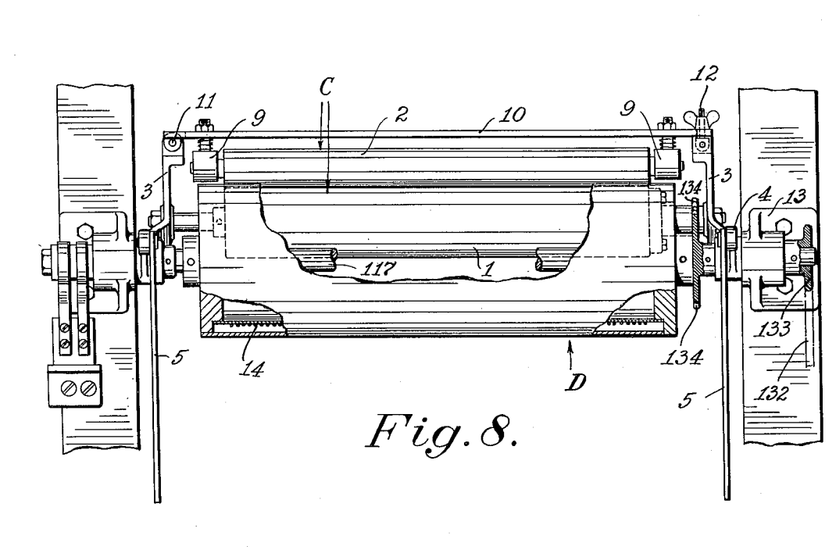
Fig. 8 is a side elevation, partly in section and partly broken away, of the strip heating rolls and the strip feed rolls, this view showing in particular the mounting of the feed rolls for bodily separation.
Figure 9:
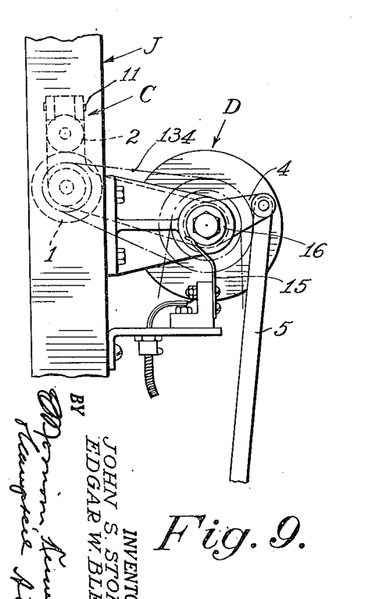
Fig. 9 is an end elevation of the parts shown in Fig. 8.

Referring to Figs. 8 and 9, the feed roll set C comprises a driven roll 1 of larger diameter and a contacting roll 2 of smaller diameter. These two rolls are carried as an assembly by a pair of arms 3, in which the larger roll 1 is journalled at its opposite ends. The arms 3 are mounted to rock about the axis of the heated roll D from the position shown in Fig. 1, with the strip A running in contact with the heated roll, to the position shown in Fig. 2, with the strip held out of contact with the heated roll. The sleeve portions of the arms 3 are provided with short cranks 4 connected by long links 5 to similar cranks 6 on a transverse hand-operated shaft 7 mounted on a fixed supporting bracket 8 (see Fig. 1) below the infeed belt H. The cranks $4^a$ associated with the lower feed roll set $C^1$ are connected in similar fashion, but by the use of shorter links $5^a$, to a second pair of cranks $6^a$ on the shaft 7, it being observed, however, that the cranks 6 and $6^a$ radiate in opposite directions from the shaft 7 so that the roll supporting arms 3 and $3^a$ will be rocked in opposite directions when the hand shaft is rotated (the upper arms 3 turning clockwise and the lower arms $3^a$ turning counterclockwise).

Referring again to Fig. 8, it will be noted that the smaller roll 2 is not journalled directly in the supporting arms 3, as is the larger roll 1, but is journalled in spring-pressed bearings 9 suspended from an overlying bar 10 extending from one arm to the other. At one end the bar 10 is pivoted to the adjacent arm 3, as at 11, and at the opposite end it is releasably connected, as by a wing nut 12, to the other arm 3. In this way, the roll 2 may be swung out of contact with the companion roll 1 to facilitate the threading of the strip A between them.

Still referring to Figs. 8 and 9, the strip heating roll D is journalled at its opposite ends in supporting brackets 13 bolted to the fixed framework J. While the roll may be heated in any suitable manner, as by means of steam or hot water, it is herein shown as heated by an electric heating unit 14 supplied with current from electric terminals 15 running in contact with commutator rings 16 on the roll supporting shaft 17. The temperature to which the roll is heated will depend, of course, upon the nature and thickness of the wrapping material employed, as well as its speed of travel through the machine. In the case of Pliofilm, the preferred material, the roll may be maintained at a temperature of about 300° F. in order to heat the strip A to a temperature in the neighborhood of 240° F.

Figure 2:
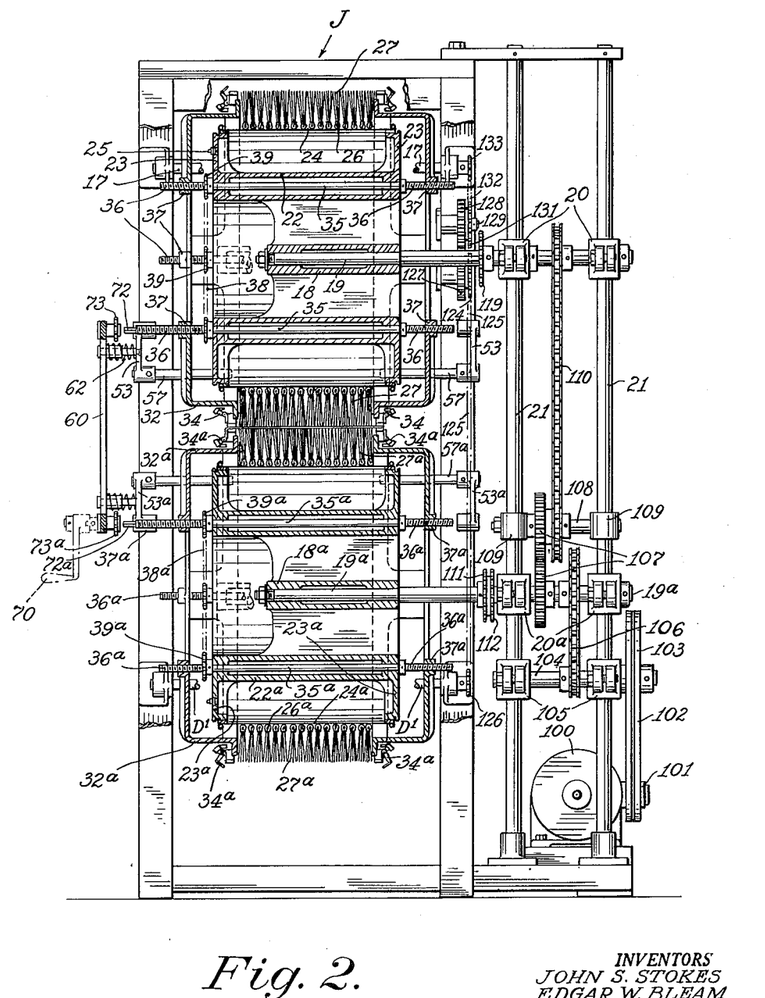
Fig. 2 is primarily a vertical section taken along the vertical center line of the two rotary wrapping members.

As before stated, the rotary wrapping member F is in the form of a rotary brush supported on a pneumatic drum which provides a resilient backing for the brush bristles. As best shown in Fig. 2, the drum 18 is secured to a shaft 19 arranged to rotate in two bearings 20 located at the rear of the machine and clamped to two pairs of upright supporting rods 21. By loosening the clamps, the bearings 20 and 20ᵃ may be raised or lowered, not only to accommodate wrapping members of different diameters, but also to control the strip sealing contact between the two wrapping members. In the drawings, for the sake of clearness, the rotary brushes are shown as making substantially a line contact, but they could be set, by the adjustment of the bearings 20 and 20ᵃ, to rotate with overlapping peripheries in order to make a flattened or extended surface contact. By arranging the bearings 20 and 20ᵃ at the rear of the machine only, the front sides of the wrapping members are left free, with no framework to interfere with the wrapping of objects which (like a bunch of celery) might project forwardly some distance from the wrapping members.

Returning to the drum 18, and still referring to Fig. 2, the drum presents a rim surface 22 and side flanges 23 radiating therefrom to provide a rather deep channel around the periphery of the drum. This channel is closed, to provide an air chamber, by means of a rubber band 24 sealed at its opposite edges in an air-tight manner to the peripheral edges of the flanges 23. If desired, compressed air may be admitted into the air chamber through an inflating valve 25 located in one of the side flanges. Wound helically around the rubber band 24, in closely spaced convolutions, is a flexible strip 26 in which are anchored a continuous series of closely spaced bristles 27 which make up the rotary brush proper. The opposite ends of the flexible strip 26 are anchored as at 28 to the two gripper wheels E.

It will now be seen that the two wrapping members F and F¹, made up in the manner just described, will present flexible yielding surfaces which by the rotation of the wrapping members will force the two advancing strips A and A¹ together into face to face contact except in those areas occupied by the objects G and which at the same time will allow said objects to stretch such localized areas of the strips and conform them thereto. In contacting with each other at the wrapping station, the brush bristles will readily yield to accommodate the successive objects to be wrapped, providing in effect mold cavities which conform in size and shape to the objects. As will be later explained, the two strips A and A¹ during the wrapping operation are firmly held at their opposite edges by the gripper wheels E and E¹ and are thus caused to be stretched by the successive objects to be wrapped, the extent of stretch, of course, depending upon the size of the objects, which force the strips out of their own planes and conform them to the surfaces of the objects in those areas which surround or enclose the objects. The bristles do not effect this stretching of the strips, although they do aid, by reason of the pressure which they exert upon the objects, to cause the strips to closely embrace the objects and to avoid the formation of folds or wrinkles. The real function of the rotary brushes is to seal the strips together around the successive objects and as close to the objects as the bristles will permit. Because of the multitude of bristles and their closely spaced relation, plus the pressure they exert, a close seal of the two strips around the individual objects will be assured.

The bristles may be composed of hair, broomcorn, sea grass, or other fibrous and flexible material, or they may be composed of rubber, nylon, or other material possessing similar properties. As will be appreciated, the nature of the bristles depends largely upon the nature of the objects to be wrapped. For instance, in wrapping solid objects the bristles could be quite stiff without doing any damage to the objects or to the strip material. On the other hand, in wrapping soft objects, the bristles should be of softer texture to avoid damage to the objects. The length of the bristles may also be widely varied, depending again upon the size of the objects. In the case of very shallow objects, the bristles alone would perform satisfactorily without a resilient backing, but to accommodate objects of all sizes, it is preferred to provide a resilient backing for the bristles, such as herein shown and described. Thus, in the case of a very large object, the bristles will not only yield in conforming themselves to the object, but will cause the rubber bands 24 and 24ᵃ to yield also to provide a mold cavity of the necessary size. Under such conditions there is both a localized and bodily yielding of the bristles, the flexible strip 26 being free to bend and float during the wrapping operation. It will be understood that the air chambers of the brush supporting drums may be inflated to any desired degree, so long as the bristles are capable of pressing the strips A and A¹ into heat sealing engagement about the individual objects. In some cases, the air chambers of the drums would not need to be inflated at all, since the elasticity of the rubber bands would be adequate alone to provide the necessary resilient backing for the brush bristles.

Figure 4:
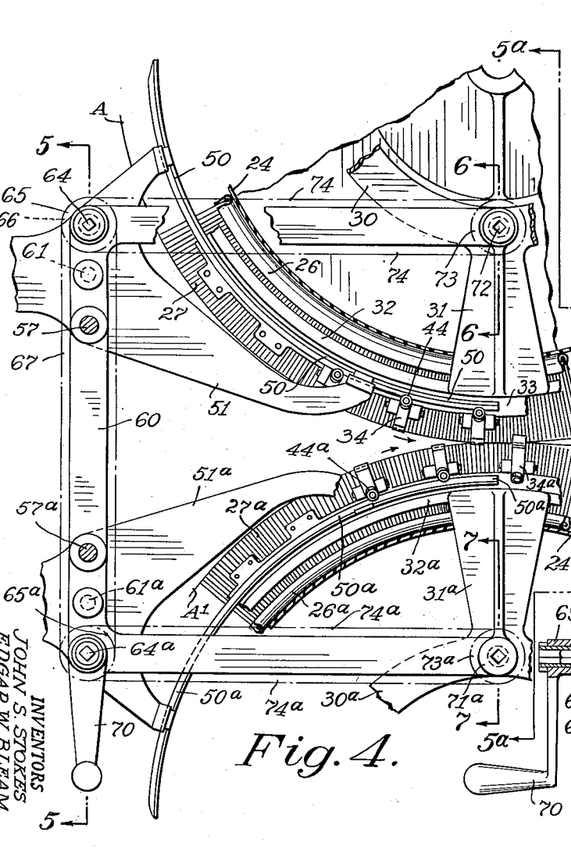
Fig. 4 is an enlarged fragmentary view, in side elevation, of the two wrapping members, showing in particular the cooperation of the two rotary brushes and the gripper wheels which advance the strips therebetween.

The two gripper wheels E are attached to the opposite sides of and are rotatable with the rotary drum 18, revolving about the same axis. Thus, referring to Figs. 1, 4 and 5, each wheel E is made up of an inner ring portion 30, spoke portions 31, and a rim portion 32, the latter being formed with an outwardly extending annular flange 33 upon which the gripper elements 34 are mounted. Four adjusting rods 35 (see Fig. 2), mounted at 90° apart, are rotatably mounted in the drum 18 and are formed at their extremities with right-hand and left-hand screw threads 36 passing through similarly threaded bushings 37 in the inner ring portions 30 of the wheels. The four adjusting rods are all connected together for rotation in unison by a sprocket chain 38 running over four sprocket wheels 39, one upon each of the rods. Hence it will be seen that the adjusting rods 35 not only provide a positive connection between the gripper wheels E and the drum 18, but also serve, by their rotation in unison, to adjust the wheels axially toward and from each other to accommodate strips of different widths.

Figures 1, 1A, 12:
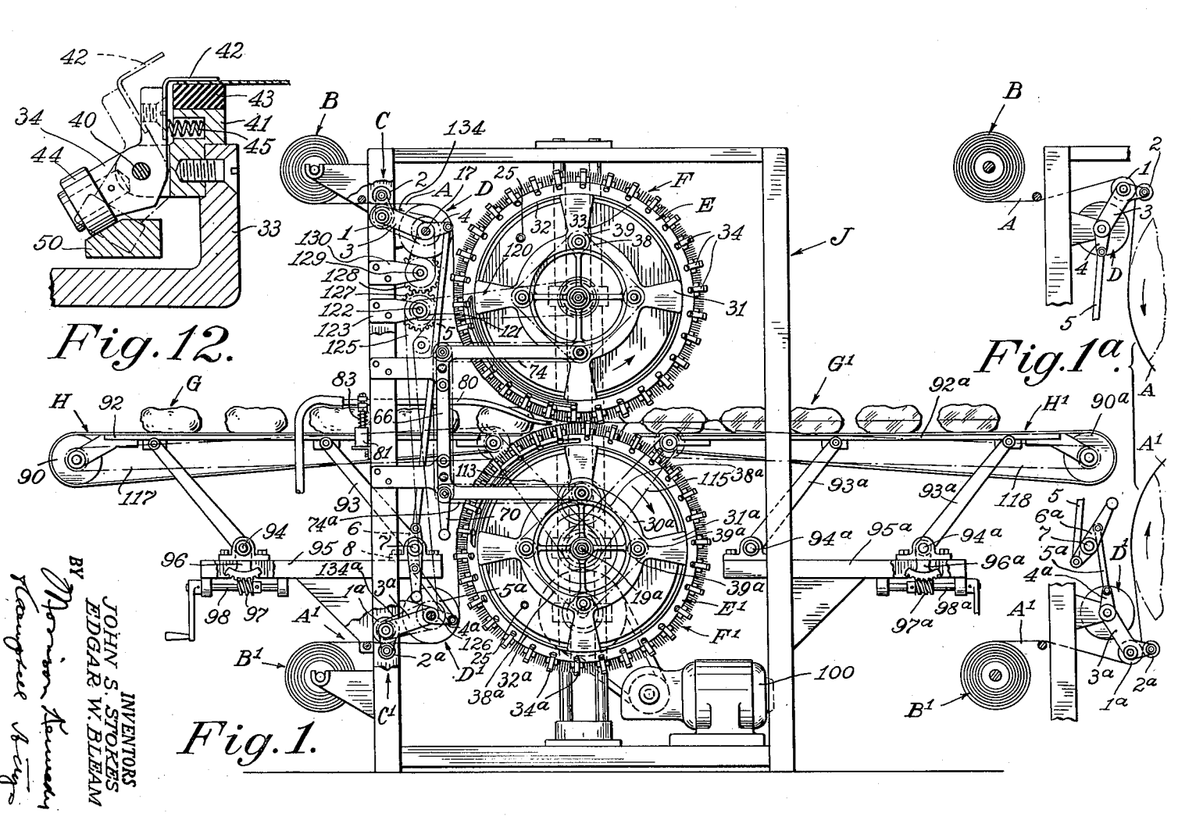
Fig. 1 is a side or front elevation of the improved machine.
Fig. 1a is a fragmentary side elevation of the strip feed rolls and the strip heating rolls, showing in particular the means employed for breaking contact between the strips and the heating rolls.
Fig. 12 is a detail section of one of the gripper elements.

One of the gripper elements 34 is shown in detail in Fig. 12. There it is shown as pivoted at 40 to a block 41 secured to the corresponding wheel flange 33. At its outer end, it is provided with a spring clamp 42 which is adapted to make contact with a rubber pad 43 on the block 41 when the clamp is closed to grip the edge of the advancing strip (see the full lines in Fig. 12). Below its pivot the gripper element 34 is provided with a roller 44 arranged to cooperate with a relatively stationary cam track 50 next to be described. A coil spring 45, arranged between the block 41 and the gripper element 34, serves normally to hold the clamp in the open position shown by the dotted lines in Fig. 12.

Each gripper wheel E, of course, is provided with a series of gripper elements 34 above described, these elements being arranged in closely spaced relation around the wheel flanges 33 and arranged to pick up the advancing strip A almost immediately after it leaves the heated roll D. There is associated with each gripper wheel a relatively stationary cam track 50 which extends through an arc of about 90° to maintain the gripper elements 34 closed from the time they pick up the traveling strip A until after it passes beyond the wrapping station. These cam tracks 50, like the gripper wheels themselves, are adjustable axially toward and from each other to the same extent in order to maintain their operative relation to the rollers 44 of the gripper elements, and to this end the tracks are fastened to movable brackets 51 connected by an adjusting rod 52 which is journalled at its opposite ends in stationary brackets 53. The rod 52 has right-hand and left-hand screw threads 54 passing through similarly threaded bushings 55 in the brackets 51. Directly below the adjusting rod 52, and in vertical alignment therewith, the brackets 53 are formed with plain bushings 56 which are slidably arranged upon guide rods 57 projecting inwardly from the stationary brackets 53.

The adjustment of the gripper wheels E and E¹ and their associated cams 50 and 50ᵃ is effected by means of a horizontally disposed U-shaped frame 60 (see Fig. 4) mounted for bodily movement in a fore-and-aft direction upon a pair of guide rods 61 and 61ᵃ projecting forwardly from the supporting brackets 53 and 53ᵃ and disposed in vertical alignment with the guide rods 57 and 57ᵃ for the cam tracks. Coil springs 62 and 62ᵃ, surrounding the guide rods 61 and 61ᵃ serve normally to hold the U-shaped frame in a forward or inoperative position but will yield readily when the frame is shifted rearwardly to its operative position, for the purpose about to be described. At its upper and lower ends, the frame 60 has journalled therein square-bored bushings 63 and 63ᵃ which have a sliding fit with the squared end portions 64 and 64ᵃ of the adjusting rods 52 and 52ᵃ for the cam tracks 50 and 50ᵃ, these bushings also being arranged in vertical alignment with the aforementioned guide rods. As clearly shown in Fig. 5, the bushings 63 and 63ᵃ are each provided with a pair of sprocket wheels 65 and 66 and 65ᵃ and 66ᵃ, respectively, the two sprocket wheels 65 and 65ᵃ being connected together by a sprocket chain 67. The squared end portion 64ᵃ of the lower adjusting rod 52ᵃ projects forwardly beyond the frame 60 and carries a clutch portion 68 to cooperate with a complementary clutch portion 69 of an operating handle 70 mounted loosely on the plain bearing surface presented by the clutch portion 68. By reference to Fig. 5 it will be seen at once that the handle 70 may be coupled to or uncoupled from the adjusting rod 52ᵃ by shifting it rearwardly or forwardly thereon. Normally it will occupy the uncoupled position shown in Fig. 5, so as to avoid any accidental operation of the adjusting rods. However, when pushed rearwardly to its coupling position, the handle may be rotated to turn the adjusting rods 52 and 52ᵃ (through the medium of the chain and sprocket connection) and thereby adjust the cam tracks 50 and 50ᵃ in one direction or the other as may be desired.

Figures 5, 6, 7:
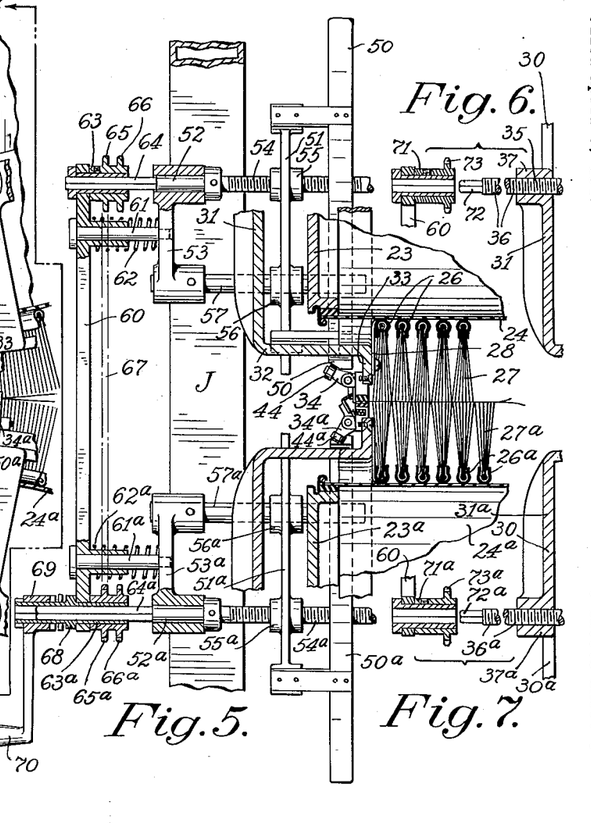
Fig. 5 is a cross section, taken partly along the line 5—5 and partly along the line 5a—5a of Fig. 4, showing again the cooperation between the rotary brushes and the gripper wheels, as well as the manually operable mechanism for adjusting the gripper wheels of each pair toward and from each other to accommodate strips of different widths.
Figs. 6 and 7 are cross sections, partly broken away, taken on the lines 6—6 and 7—7 respectively of Fig. 4, showing details of the manual adjusting mechanism for the gripper wheels.

It remains to be described how the adjusting rods 35 and 35ᵃ for the two pairs of gripper wheels are rotated in effecting the adjustment of the wheels. This is accomplished by mounting in the free ends of the U-shaped frame 60 two further square-bored bushings 71 and 71ᵃ which are adapted to be coupled to or uncoupled from the squared end portions 72 and 72ᵃ formed each on one of the four adjusting rods 35 and 35ᵃ of the two pairs of gripper wheels (Figs. 6 and 7). These bushings 71 and 71ᵃ have fast thereon sprocket wheels 73 and 73ᵃ, the former being connected by a sprocket chain 74 to the second sprocket wheel 66 on the aforementioned bushing 63 and the latter being connected by a sprocket chain 74ᵃ to the second sprocket wheel 66ᵃ on the aforementioned bushing 63ᵃ. As before stated, the frame 60 is mounted for a fore-and-aft bodily movement on its guide rods 61 and 61ᵃ, and it is this movement of the frame which effects the coupling and uncoupling of the bushings 71 and 71ᵃ to and from the adjusting rods 35 and 35ᵃ. In other words, when the frame 60 is pushed rearwardly, and the hand lever 70 is pushed rearwardly therewith, the hand lever is operatively connected to all of the adjusting rods referred to, namely, the adjusting rods 52 and 52ᵃ for the cam tracks 50 and 50ᵃ, and the adjusting rods 35 and 35ᵃ of the two pairs of gripper wheels E and E¹, all these rods being rotated in unison by the rotation of the handle to effect the corresponding adjustments of the cam tracks and wheels. When the pressure on the frame 60 is released, it will be shifted forwardly by the spring 62 and 62ᵃ to break the connection between the hand lever and the adjusting rods.

It may here be noted that, due to the connection of the bristle strips 26 and 26ᵃ to the side flanges of the gripper wheels E and E¹, the convolutions of these strips will be pulled apart or pushed together in an accordian fashion to conform. In other words, the width of the two rotary brushes may be varied simultaneously with the adjustment of the gripper wheels provided, of course, the extent of adjustment is not too great to permit the brushes to function in the proper manner. For extreme adjustments, it may be desirable to remove the strips 26 and 26ᵃ and replace them by other strips of proper length. No adjustment in width of the drums 18 and 18ᵃ has been provided for, since it is proposed to make the widths of the rubber bands 24 and 24ᵃ great enough to take care of the widest strip which the machine is capable of handling.

The vacuumizing of the individual packages is accomplished by a very simple form of apparatus, which merely consists (see Figs. 1, 3, 10 and 11) of a pair of suction nozzles 80 hinged for lateral swinging movement upon a pair of stationary blocks 81 and connected by flexible hosing to a vacuum pump (not shown). The nozzles are supported well above and at one side of the infeed belt H so as not to interfere with the feeding of the articles to be wrapped but, just beyond the delivery end of said belt, the nozzles are bent downwardly and inwardly to position their inlet ends in close proximity to the center line of the advancing strips and in the sealing plane of said strips. This innermost (almost touching) position of the nozzles is determined by set screws 82 arranged a little forward of the hinge axes and against which the nozzles are yieldingly held by torsion springs 83 coiled about the hinge pins. It will be noted, both from Fig. 1 and Fig. 3, that the nozzles terminate at their inner ends just short of the sealing point of the two strips so as thereby to minimize the danger of drawing the strips into the nozzles under the vacuum applied. The nozzles are also formed with side slots 84 at their inlet ends to contribute to the same result as well as to facilitate the flow of air in horizontal paths into the nozzles from the spaces created midway around the individual objects as the strips are sealed together about them.

The operation of the nozzles will now be clear: As each successive object to be wrapped is presented between the rotary brushes, it will pass between the two nozzles and move them apart, the leading end of the object first contacting the nozzle inlets and the latter then being caused (by virtue of the spring tension) to follow along and in contact with the opposite sides of the object in the sealing plane and finally along and in contact with the following end of the object as it emerges from between the nozzle inlets, which by that time have returned to their original innermost positions and thus remain effective to the very end of the sealing operation. In this way, the vacuum is applied progressively during the formation of each individual package and becomes fully effective just prior to the sealing of the package. As a result the seam formed by the sealing of the strips around each individual object is drawn into tight contact with the object, creating a tight fitting and air-tight wrapper for the object. Of course the action of the brushes in pressing the two strips against the object also contributes to this result, since much of the air which would otherwise be trapped between the wrapper and the object is gradually forced out due to the progressive action of the brushes in sealing the strips together. In some instances, if desired, the nozzles could be arranged with their inlet ends terminating beyond the sealing point of the strips in order to obtain a higher vacuum pressure but, for universal purposes, it is preferred to arrange the nozzles in the manner above described and for the reasons stated.

Figures 3, 10, 11:
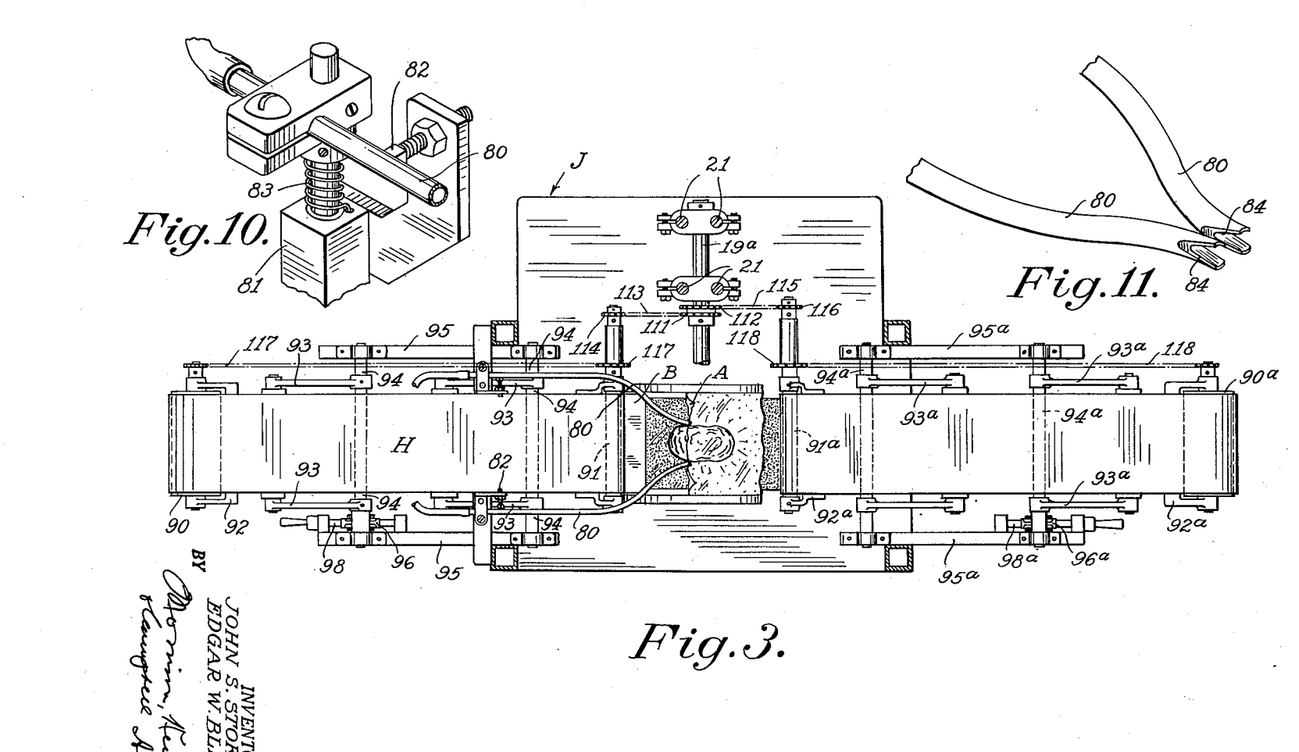
Fig. 3 is a top plan view of the infeed and outfeed conveyor belts, but showing in between an object in course of wrapping and the two suction nozzles in action.
Fig. 10 is a detail perspective view showing the mounting for one of the suction nozzles.
Fig. 11 is a fragmentary perspective view of the two suction nozzles as they appear in their innermost positions.

The infeed mechanism will now be described, having reference to Figs. 1 and 3. The conveyor belt H, which is horizontally disposed along its upper stretch, runs over pulleys 90 and 91 journalled in bearings formed in the opposite ends of a platform 92 located directly beneath and in supporting contact with the upper stretch of the belt. This platform 92 (wth the conveyor belt H) is supported at the upper ends of two pairs of parallel links 93 which are attached at their lower ends to fore-and-aft rock shafts 94 journalled in suitable bearings on a pair of brackets 95 secured to the fixed framework J. One of these rock shafts 94 (that to the left in Figs. 1 and 3) has fast thereto a depending worm gear segment 96 with which meshes a worm 97 on a hand-operated shaft 98 journalled in bearings on the underside of the front bracket 95. It is pointed out that the radius of the parallel motion links 93 is substantially equal to the radius of the lower rotary brush $F^1$, so that when the hand-operated shaft 98 is turned to raise or lower the belt H through the connections described, the delivery end of the belt will be caused to follow an arcuate path conforming to the periphery of the rotary brush. It may also be mentioned at this point that this parallel link motion is designed also to permit the driving connections for the belt H to be maintained in all of its different adjusted positions. As before stated, the purpose of adjusting the belt H to different levels is to centralize the objects to be wrapped with reference to the sealing plane of the two strips.

The outfeed conveyor belt $H^1$ is supported in precisely the same way as the infeed belt H and for the same reason. In the circumstances, it seems unnecessary to repeat the description, it being sufficient to say that the corresponding parts are identified by the same reference numerals with the exponent $a$. It may be added, however, and as will clearly appear from Fig. 1, that the parallel motion links $93^a$ are inclined in a direction opposite to that of the links 93, so that when the belt $H^1$ is raised and lowered by the hand-operated shaft $98^a$ the receiving end of the belt $H^1$ (as in the case of the delivery end of the belt H) will be caused to follow an arcuate path conforming to the periphery of the lower rotary brush $F^1$.

There remains to be described the driving connections for the various continuously operated parts, the connections herein shown being merely by way of example. Starting with the prime mover or electric motor 100 (see Figs. 1 and 2) its driving shaft has a V-pulley 101 connected by a V-belt 102 to a V-pulley 103 on a countershaft 104 journalled in bearings 105 clamped to and adjustable on the two pairs of upright rods 21 before alluded to. The countershaft 104 is connected by a chain and sprocket connection 106 to the shaft $19^a$ on which the lower drum $18^a$ is supported. The shaft $19^a$ is connected by reversible gearing 107 to another countershaft 108 which, like the countershaft 104, is journalled in bearings 109 clamped to and adjustable on the upright rods 21. This countershaft 108 is connected by a chain and sprocket connection 110 to the shaft 19 upon which the upper drum 18 is supported. As thus far described, the driving connections serve, by the rotation of the drums 18 and 19, to rotate the gripper wheels E and $E^1$ and the rotary brushes F and $F^1$ in opposite directions, the upper unit turning couterclockwise, and the lower unit turning clockwise, as indicated by the arrows in Fig. 1.

The driving connections are established between the lower drum shaft $19^a$ and the two conveyor belts H and $H^1$. Thus the shaft is provided with two sprocket wheels 111 and 112 arranged side by side, the sprocket wheel 111 being connected by a sprocket chain 113 to a sprocket wheel 114 on the shaft of the belt pulley 91, and the sprocket wheel 112 being connected by a sprocket chain 115 to a sprocket wheel 116 on the shaft of the belt pulley 91ª. Since, as before stated, the pulleys 91 and 91ª, by reason of the parallel motion links 93 an 93ª, are caused to travel in arcuate paths concentric to the axis of rotation of the lower drum shaft 19ª, the chain and sprocket connections just described will be maintained in all adjusted positions of the conveyor belts but, to make the arrangement entirely clear, it may again be stated that the radius of the parallel motion links 93 and 93ª is equal to the radial distance from the axis of rotation of the sprocket wheels 111 and 112 to the axes of rotation of the sprocket wheels 114 and 116 as clearly shown in Fig. 1. A chain and sprocket connection 117 is provided between the pulleys 90 and 91 and a similar chain and sprocket connection 118 is provided between the pulleys 90ª and 91ª, so that both pulleys of each conveyor belt will be positively driven from the drum shaft 19ª, both in the same direction as indicated by the arrows in Fig. 1.

The feed rolls C and the heated roll D are operated from the shaft 19 of the upper drum 18 (see Figs. 1 and 2). The shaft 19 carries a sprocket wheel 119 connected by a sprocket chain 120 to a sprocket wheel 121 attached to a stub shaft 122 supported in a fixed bracket 123. The shaft 122 has attached thereto a second sprocket wheel 124 connected by a long sprocket chain 125 to a sprocket wheel 126 secured to the rear end of the shaft of the lower heated roll D¹. The stub shaft 122 also carries a gear 127 which meshes with a similar gear 128 on another stub shaft 129 journalled in a second fixed bracket 130. This second stub shaft 129 also carries a sprocket wheel 131 which is connected by a short sprocket chain 132 to a sprocket wheel 133 on the shaft 17 of the upper heated roll D (see also Fig. 8). As best shown in Figs. 8 and 9, the roll shaft is connected by a chain and sprocket connection 134 to the shaft of the feed roll 1, and a similar chain and sprocket connection is made between the shaft for the lower heated roll D¹ and the shaft of the associated feed roll 1ª (see Fig. 1). In short, both sets of feed rolls C and C¹, as well as the two heated rolls D and D¹, are positively and continuously operated, through the connections described, from the upper drum shaft 19 and in the proper directions, the upper roll D and its associated feed roll 1 rotating clockwise and the lower roll D¹ and is associated feed roll 2ª rotating counterclockwise in order to feed the strips A and A¹ to the oppositely rotating gripper wheels E and E¹.

Without going into further detail, it may be noted that the driving connections are so designed and proportioned as to operate all of the parts in proper synchronism and at the proper speeds. In this connection, it should perhaps be mentioned again that the gripper wheels E and E¹ (and of course the rotary brushes F and F¹ with them) are rotated at a higher rate of speed than that of the feed rolls C and C¹ and the heated rolls D and D¹ in order to stretch the strips A and A¹ longitudinally to a substantial extent as they leave the heated rolls. To state it differently, the linear speed of travel of the two strips under the influence of the gripper wheels is substantially greater than the linear speed of travel imparted to them by the feed rolls, this difference in speed being regulated to give the amount of stretch desired.

It is believed that the operation of the machine has already been sufficiently described and that no recapitulation is necessary.

Some variations and modifications have already been indicated and others will readily suggest themselves to those skilled in the art. For example, instead of being of rotary form, the brushes and gripper wheels could be in the form of endless conveyor belts; such an arrangement would be particularly suitable for wrapping material which requires a more prolonged period for the sealing operation. Then, too, under certain conditions, only one of the wrapping members need be of the brush type, the other wrapping member being of some other type, although preferably with a flexible yielding surface such as might be constituted directly by the elastic band 24 or 24ª. If the invention were applied to a machine of the intermittent type, as it could be, the brushes could be made with straight or flat contacting surfaces and moved into and out of engagement with each other to effect the sealing operation in the manner of the platens of a press. It should therefore be understood that the invention is not limited to any specific embodiment or mode of operation except insofar as such limitations are specified in the appended claims.

Having thus described our invention, what we claim is:

1. A machine for wrapping objects in heat-sealable sheet material comprising, in combination, means for positioning two blanks of such material in opposed relation to each other at the wrapping station, means for heating the blanks to render them sealable, and a pair of cooperating members for simultaneously pressing the two blanks against and sealing them around the object to be wrapped, characterized in that at least one of said members is in the form of a brush whose bristles provide a flexible yielding surface which conforms itself to the object during the wrapping operation.

2. A machine for wrapping objects in heat-sealable sheet material comprising, in combination, means for feeding two continuous strips of such material in opposed spaced relation to each other, means for heating the strips progressively to render them sealable, and a pair of cooperating members for simultaneously pressing the strips against and sealing them around successive objects placed therebetween to form a series of individual packages, characterized in that at least one of said members is in the form of an endless traveling brush whose bristles provide a flexible yielding surface which conforms itself to the successive objects as they are wrapped.

3. A machine for wrapping objects in heat-sealable sheet material comprising, in combination, means for feeding two continuous strips of such material in opposed spaced relation to each other, means for heating the strips progressively to render them sealable, and a pair of cooperating members for simultaneously pressing the strips against and sealing them around successive objects placed therebetween to form a series of individual packages, characterized in that at least one of said members is in the form of a rotary brush whose bristles provide a flexible yielding surface which conforms itself to the successive objects as they are wrapped.

4. A machine for wrapping objects in heat-stretchable and heat-sealable sheet material comprising, in combination, means for feeding two continuous strips of such material in opposed spaced relation to each other, means for heating the strips progressively to impart to them the requisite stretchable and sealable properties, means for maintaining the heated strips against contraction until the wrapping operation has been performed, and a pair of cooperating rotary brushes between which the strips, with the objects to be wrapped placed between them in longitudinal spaced relation, are fed, said brushes presenting flexible yielding surfaces which force the strips together into face to face contact in those areas occupied by the successive objects and which at the same time allow said objects to stretch such areas of the strips and conform them thereto while the strips are maintained against contraction.

5. A machine for wrapping objects in heat-stretchable and heat-sealable material comprising, in combination, means for drawing two continuous strips of such material from their sources of supply and heating them progressively to impart to them the requisite stretchable and sealable properties, two pairs of gripper wheels arranged to engage the respective strips at their opposite edges to advance the same in unison, the gripper wheels of each pair being adjustable axially toward and from each other to accommodate strips of different widths, and a pair of cooperating rotary wrapping members arranged between the respective pairs of gripper wheels and mounted to rotate about the same axes, said pairs of gripper wheels acting to pick up the strips before they reach the wrapping members and hold them against contraction until the wrapping operation has been performed, said wrapping members having yielding surfaces which force the strips together into face to face contact while still engaged by the gripper wheels except in those areas occupied by the successive objects and which at the same time allow said objects to stretch such areas of the strips and conform them thereto.

6. A machine according to claim 5, including manual means for effecting such adjustment of the gripper wheels, said means being normally disconnected from the wheels to permit their free rotation during the operation of the machine.

7. A machine according to claim 5, including manual means operable to effect the adjustment of the gripper wheels of both pairs simultaneously.

8. A machine for wrapping objects in heat-stretchable and heat-sealable sheet material comprising, in combination, means for feeding two continuous strips of such material in opposed spaced relation to each other, means for heating the strips progressively to impart to them the requisite stretchable and sealable properties, yielding means for simultaneously pressing the strips against and sealing them around successive objects placed therebetween while at the same time causing said objects by direct contact with the strips to stretch the latter and conform them thereto, and vacuum means for evacuating air from the packages as they are successively formed to cause the strips to closely embrace the enclosed objects, said vacuum means including a suction nozzle movably mounted on a stationary support, and yielding means for holding the inlet end of the nozzle in dragging contact with the side of each successive object during the progressive wrapping of said object.

9. A machine for wrapping objects in heat-stretchable and heat-sealable sheet material comprising, in combination, means for feeding two continuous strips of such material in opposed spaced relation to each other, means for heating the strips progressively to impart to them the requisite stretchable and sealable properties, yielding means for simultaneously pressing the strips against and sealing them around successive objects placed therebetween while at the same time causing said objects by direct contact with the strips to stretch the latter and conform them thereto, and vacuum means for evacuating air from the packages as they are successively formed to cause the strips to closely embrace the enclosed objects, said vacuum means including a suction nozzle swiveled to a stationary support for a lateral swinging movement toward and from the center line of the advancing strips and normally held under spring tension in an inner position adjacent the center line, whereby it is contacted by each successive object and caused to follow along the side thereof during the progressive wrapping of the object.

10. A machine according to claim 9, equipped with two such suction nozzles arranged to operate along opposite sides of each successive object.

11. A machine for wrapping objects of different sizes comprising, in combination, means for advancing two continuous strips of sheet material in opposed relation to each other, a pair of cooperating wrapping members for sealing the strips together around the successive objects to be wrapped to form a series of individual packages, means for feeding the successive objects to the wrapping members, and means for adjusting said feeding means, both upwardly and downwardly and toward and from the wrapping members, to set said feeding means in different positions to centralize different sizes of objects to be wrapped with reference to the sealing plane of the two strips.

12. A machine according to claim 11, wherein the feeding means comprise an endless conveyor belt and driving connections therefor which are maintained in all adjusted positions thereof.

13. A machine for wrapping objects of different sizes comprising, in combination, means for advancing two continuous strips of sheet material in opposed relation to each other, a pair of cooperating rotary wrapping members having flexible yielding surfaces for sealing the strips together around the successive objects to be wrapped to form a series of individual packages, an endless conveyor belt for feeding the successive objects to the wrapping members, and means for adjusting said conveyor belt to different levels to centralize different sizes of objects to be wrapped with reference to the sealing plane of the two strips, said belt adjusting means including parallel motion links having a radius equal to that of the rotary wrapping members and mounted to turn about axes located in a horizontal plane passing through the axis of the lower wrapping member, whereby the delivery end of the conveyor belt in its adjustment will be caused to travel in an arcuate path conforming to the periphery of the lower wrapping member.

14. A machine according to claim 11 and including, as additional elements of the combination, means for delivering the wrapped packages from the machine, and means for adjusting said delivery means, both upwardly and downwardly and toward and from said wrapping members, to locate said delivery means in different positions to centralize different sizes of wrapped objects with reference to the sealing plane of the two strips.

15. A machine according to claim 14, wherein the delivery means comprise a conveyor belt and driving connections therefor which are maintained in all adjusted positions thereof.

16. A machine according to claim 13 and including, as additional elements of the combination, an endless conveyor belt for delivering the packages from the machine, and means for adjusting the conveyor belt to different levels to centralize different sizes of wrapped objects with reference to the sealing plane of the two strips, said belt adjusting means including parallel motion links having a radius equal to that of the rotary wrapping members and mounted to turn about axes located in a horizontal plane passing through the axis of the lower wrapping member, whereby the receiving end of the delivery belt in its adjustment will be caused to travel in an arcuate path conforming to the periphery of the lower wrapping member.

JOHN S. STOKES.
EDGAR W. BLEAM.

REFERENCES CITED

The following references are of record in the file of this patent:

UNITED STATES PATENTS

| Number | Name | Date |
| --- | --- | --- |
| 1,737,016 | Milmoe | Nov. 26, 1929 |
| 1,796,773 | Townsend | Mar. 17, 1931 |
| 1,886,136 | Taylor | Nov. 1, 1932 |
| 2,037,825 | Salfisberg | Apr. 21, 1936 |
| 2,083,617 | Salfisberg | June 15, 1937 |
| 2,103,339 | Salfisberg | Dec. 28, 1937 |
| 2,113,636 | Vogt | Apr. 12, 1938 |
| 2,145,941 | Maxfield | Feb. 7, 1939 |
| 2,208,951 | Tamossy | July 23, 1940 |
| 2,281,412 | Cave et al. | Apr. 28, 1942 |
| 2,301,222 | Minich | Nov. 10, 1942 |
| 2,335,190 | Minich | Nov. 23, 1943 |
| 2,340,260 | Clunan | Jan. 25, 1944 |
| 2,342,977 | Snyder | Feb. 29, 1944 |
| 2,387,812 | Sonneborn et al. | Oct. 30, 1945 |
| 2,403,482 | Cloud | July 9, 1946 |
| 2,490,781 | Cloud | Dec. 13, 1949 |